(12) United States Patent
Burge et al.

(10) Patent No.: US 6,470,547 B2
(45) Date of Patent: Oct. 29, 2002

(54) MACHINING CENTER WITH AN INTEGRAL CONTINUOUS PRESSURE HYDRAULIC CLAMPING SYSTEM

(75) Inventors: Phillip Burge, Indianapolis; Douglas Krumreich, Avon; James Denney, Indianapolis, all of IN (US)

(73) Assignee: Intercore Resources, Inc., Indianapolis, IN (US)

( * ) Notice: Subject to any disclaimer, the term of this patent is extended or adjusted under 35 U.S.C. 154(b) by 49 days.

(21) Appl. No.: 09/681,158

(22) Filed: Feb. 1, 2001

(65) Prior Publication Data

US 2001/0032384 A1 Oct. 25, 2001

Related U.S. Application Data

(60) Provisional application No. 60/180,320, filed on Feb. 4, 2000.

(51) Int. Cl.⁷ .......................... B23Q 7/14; B23Q 3/06; B23C 9/00
(52) U.S. Cl. ...................... 29/33 P; 29/563; 198/343.2; 409/225
(58) Field of Search ................................. 29/33 P, 563, 29/564, 38 A, 38 B, 38 C; 198/346.1, 465.1, 343.2; 409/225; 269/20

(56) References Cited

U.S. PATENT DOCUMENTS

| | | | | |
|---|---|---|---|---|
| 3,994,100 A | * | 11/1976 | Shelden | 29/38 A X |
| 4,018,429 A | * | 4/1977 | Alafuzov | 269/20 |
| 4,955,463 A | * | 9/1990 | Honma et al. | 198/465.1 X |
| 5,261,147 A | * | 11/1993 | Wood, III | 29/33 P |
| 5,265,497 A | * | 11/1993 | Curless | 29/33 P X |
| 5,531,004 A | * | 7/1996 | Ahn | 29/33 P |
| 5,992,608 A | * | 11/1999 | Ahn | 198/346.1 |

* cited by examiner

Primary Examiner—William Briggs
(74) Attorney, Agent, or Firm—McGarry Bair LLP

(57) ABSTRACT

The invention relates to a machining center comprising a pallet changing station in combination with a machining station. The pallet changing station includes a rotating column assembly supporting a platform on which multiple fixtures are supported and moved. A portion of the column assembly defines part of a hydraulic conduit for supplying hydraulic fluid from a fluid source to the fixture for use in clamping parts to the fixture. The integration of a portion of the hydraulic conduit with the rotating column reduces the tendency for the hydraulic conduit to become twisted during rotation of the column or for the various threaded connections of the hydraulic conduit from loosening.

33 Claims, 7 Drawing Sheets

MACHINING CENTER WITH AN INTEGRAL CONTINUOUS PRESSURE HYDRAULIC CLAMPING SYSTEM

CROSS REFERENCE TO RELATED APPLICATIONS

This application claims prioirty on U.S. Provisional Patent Application No. 60/180,320 filed Feb. 4, 2000.

BACKGROUND OF THE INVENTION

1. Field of the Invention

The invention relates to a machining center for the machining (drilling, milling, etc.) of one or more parts clamped to a fixture; and, more particularly, to an integral continuous pressure hydraulic pressure clamping system for use with the machining center to supply hydraulic fluid to the fixtures to provide a controllable clamping force.

2. Related Art

Machining centers, such as CNC machining centers, are widely used in the production of precision parts. Generally, most machining centers employ a pallet changing station. The unmachined parts are clamped to a fixture that is moved into and out of the machining area by the pallet changing station.

The pallet changing station typically comprises an external housing in which is mounted a vertically-oriented rotating column that carries a dividing wall and a platform on which the fixtures are positioned. The dividing wall effectively encloses a portion of the column and divides the interior of the pallet changing station into a load area and a machining area. Each of the load area and the machining area support a fixture. In that manner, the parts of the fixture in the machining area can be machined while the fixture in the load area can be loaded with new parts or the fixture replaced entirely. The fixture in the load area can be rotated for better access in the load area.

To exchange one fixture for another the machining area fixture is retracted onto the rotating platform of the pallet changing station. The column is moved upward and rotated to move the one fixture currently in the machining area to the loading area, which simultaneously moves the fixture that was in the loading area into the machining area. Typically, the rotational movement of the column is coupled with a vertical upward movement, which unseals the dividing wall carried by the column with respect to the external housing. The rotation is typically limited to approximately 180° in a clockwise/counterclockwise operation.

The supplying of hydraulic fluid to the fixtures is a continuous source of problems because the fluid lines extending to the fixtures must be capable of rotating with the column of the pallet changing station while accommodating the extension and retraction and rotation of the fixture relative to the column without tangling or breaking the hydraulic connection or requiring their uncoupling and recoupling.

Applicants previous solution to addressing the problems of supplying hydraulic lines to the fixtures included directing the hydraulic lines into the pallet changing station along the rotating column and delivering the hydraulic lines from the rotating column to the fixture through a multi-segmented articulating arm. One end of each arm is mounted to an opposing portion of the rotating shaft and the other end of the arm mounts to a rotary coupling adapted to mount to the fixture. A disadvantage of this system is that the hydraulic lines required individual rotary couplings to permit them to run along the rotating column without twisting during rotation of the column and still be fed through the articulating arms. The repeated rotation of the pallet changing station loosened the individual rotary couplings requiring frequent maintenance and lost production time.

SUMMARY OF THE INVENTION

The invention relates to an improved machining center for machining parts carried by a fixture. The machining center comprises a housing that defines the fixture loading area for receiving the fixture and the machining area for receiving the fixture during the machining of the parts. A machining tool is located in the machining area for performing machining operations on a part that is carried by the fixture. The machining center further comprises a pallet changing station having a vertically-oriented rotating column assembly and a platform for supporting the fixture. The platform is mounted to the column and has a first portion that is located in the loading area and a second portion located in the machining area. The rotation of the column assembly moves the platform first portion from the loading area to the machining area and the platform second portion from the machining area to the loading area. In this manner, the fixture is moved on the loading area to the machining area for performing the machining operations on the parts and from the machining area to the loading area for removing the machined parts from the fixture. A clamping system comprising a hydraulic conduit extending into the pallet changing station is provided for supplying pressurized hydraulic fluid to the fixture from a source of pressurized hydraulic load to aid in the clamping of the parts to the fixture. The improvement in the machining center comprises the column assembly having a portion with an internal bore forming part of the hydraulic conduit for fluid connection of hydraulic fluid source with the clamping system.

Preferably, the internal bore has an inlet located on an exterior portion of the column assembly for fluidly connecting with the hydraulic fluid source and an outlet on an exterior portion of the column assembly for fluidly connecting with the clamping system. The outlet can be located interiorly of the housing and within the pallet changing station. The outlet can be located exteriorly of the housing.

The machining center can further comprise a rotary coupling for fluidly connecting the inlet of the internal bore with the hydraulic fluid source. A second rotary coupling can be provided for connecting the hydraulic conduit with the fixture. Preferably, the hydraulic conduit comprises a hydraulic line extending from the bore outlet to the fixture.

The machining center can include an articulating arm with a hollow interior. The arm includes a first end that is mounted to the column assembly and a second end that mounts to the second rotary coupling. The hydraulic line extends through the hollow interior of the arm from the column assembly to the second rotary coupling. The arm preferably comprises multiple segments, with each of the segments being hingedly connected to prevent their relative rotation. The hinged connections are oriented to permit the arm to rotate relative to both a horizontal aid a vertical axis.

The column assembly preferably comprises a shaft with an internal bore forming a portion of the column assembly that forms part of the hydraulic conduit and a column to which the platform is mounted. A lower end of the shaft is mounted to an upper end of the column to form the column assembly. The shaft comprises a base forming the shaft lower end, and the base has a peripheral wall on which the outlet is located. The shaft also has an upper on which the inlet is located. The bore comprises a first portion that extends from the inlet axially through the shaft toward the base and a second portion that extends radially from the first portion through the base to the outlet.

Preferably, there are multiple hydraulic conduits and multiple bores with corresponding inlets located on the shaft upper end and corresponding outlets located on the base peripheral wall. The bores are preferably formed by gun-drilling.

The machining center can further comprise a lift mechanism that is mounted to the housing and operably coupled to the shaft to thereby move the shaft between a lowered position and a raised position to effect the raising and lowering of the platform. The lift mechanism includes a lift cylinder having a hollow interior that slidably receives the shaft and a piston fixedly mounted to the shaft and located within the lift cylinder hollow interior. Pressurized fluid is introduced and exhausted from the lift cylinder to reciprocate the piston within the lift cylinder to move the shaft between the lowered and raised positions.

In another aspect, the invention relates to a column assembly for a machining center for machining parts carried by a fixture. The machining center comprises a housing defining a fixture loading area for receiving the fixture and a machining area for receiving the fixture during the machining of parts. A machining tool is located in the machining area for performing machining operations on a part carried by the fixture. The machining center further comprises a pallet changing station having a movable platform with a first portion located in the loading area and a second portion located in the machining area. The movement of the platform moves the platform first portion from the loading area to the machining area and the platform second portion from the machining area to the loading area to thereby move the fixture between the loading area and the machining area. A clamping system is provided and comprises a hydraulic conduit extending into the pallet changing station for supplying pressurized hydraulic fluid to the fixture from a source of pressurized hydraulic fluid to aid in the clamping of the parts to the fixture. The column assembly comprises a portion having an internal bore that forms part of the hydraulic conduit and is mounted for rotational movement relative to the housing. The column assembly carries the platform whereby the rotation of the column assembly moves the platform first portion from the loading area to the machining area in the platform second portion from the machining area to the loading area.

DETAILED DESCRIPTION

Figure 1:
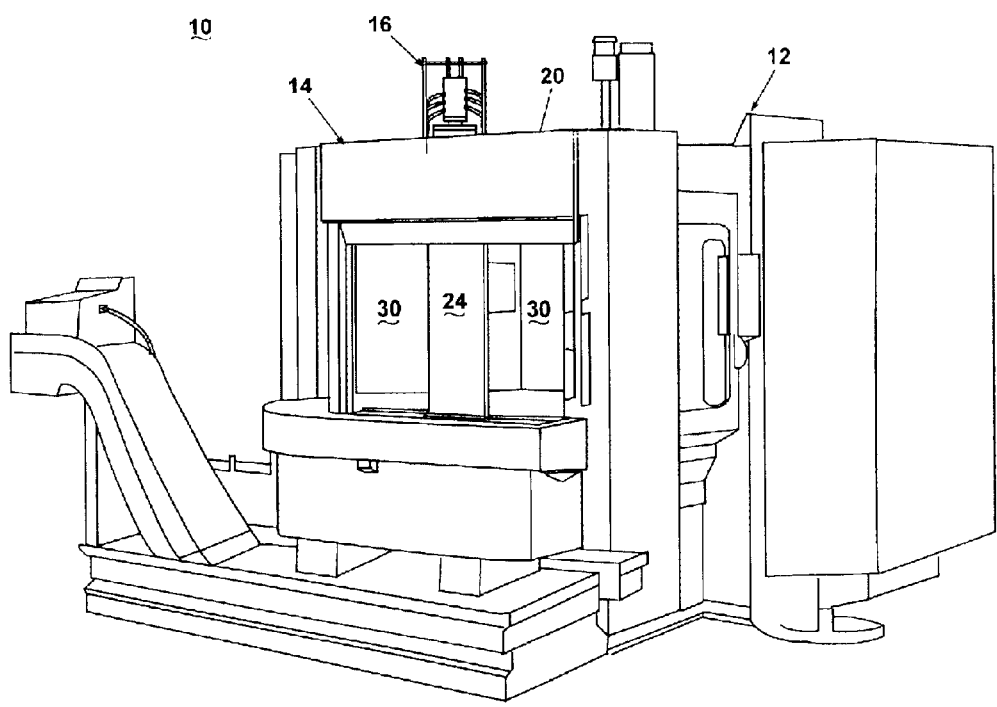
FIG. 1 is a perspective view of a machining center comprising a machining station in combination with a pallet changing station incorporating an integral continuous pressure clamping system according to the invention.

FIG. 1 illustrates a machining center 10 comprising a machining area 12 and a pallet changing station 14 incorporating an integral continuous pressure clamping system 16 according to the invention. There are many commercially available machining centers 10 that are suitable for use in the invention. Suitable machining centers are the A77, A66 and the A55 manufactured by Makino. The general components and functions of commercially available machining centers are commonly known. Therefore, the machining center 10 will only be described to the extent necessary to describe the invention. Components and functions of the machining center 10 not needed to understand the invention or which are commonly known to those skilled in the art, such as the programmable logic controller and the hydraulic plumbing, will not be described in detail.

Figure 2:
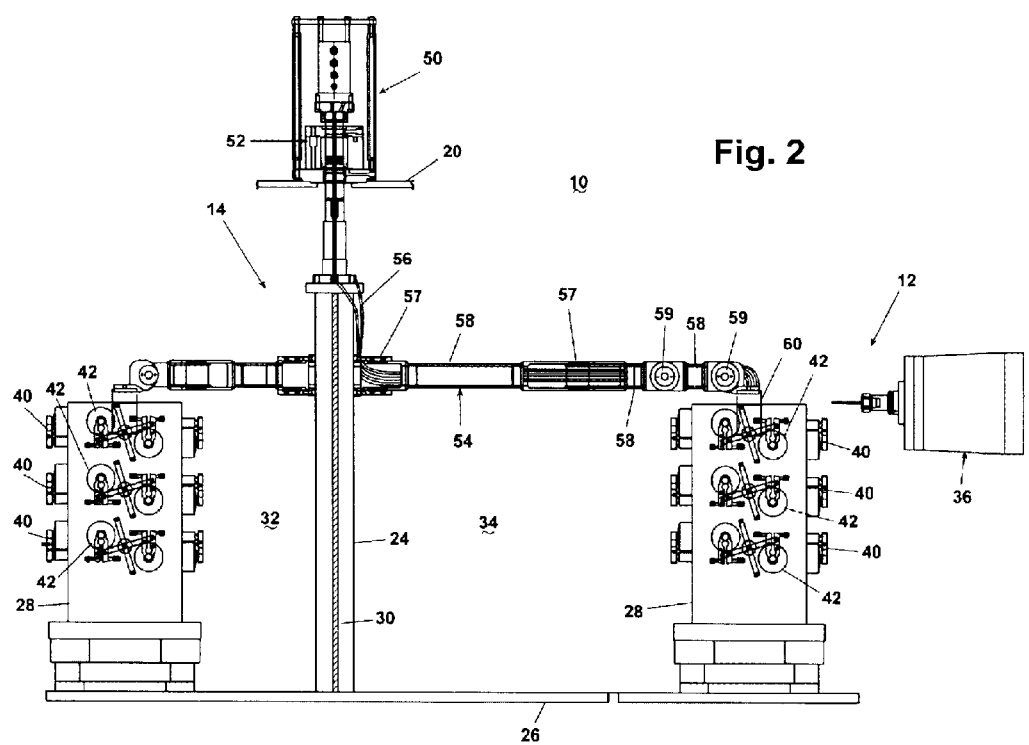
FIG. 2 is a schematic view of the machining station of FIG. 1 illustrating the pallet changing station, machining station and the integral continuous pressure clamping system of the invention.

Referring to FIGS. 1 and 2, the pallet changing station 14 comprises an external housing 20 in which is mounted a vertical-oriented, rotating column 24 which is positioned within the housing and supports a platform 26 on which the fixtures 28 are located during a pallet change. A partition wall 30 extends laterally from the rotatable column 24 and effectively divides the interior of the pallet changing station 14 into a load area 32 and a machining area 34, which is adjacent to a machining tool 35 of the machining spindle 36. The fixtures 28 include a chuck assembly 40 and a clamp assembly 42. The clamp assembly 42 and the chuck assembly 40 are operated by hydraulic pressure.

A brief generic description of the operation of the machining center 10 will be helpful to a complete understanding of the invention. The pallet changing station 14 permits a fixture 28 loaded with parts for machining to be moved from the load area 32 into the machining area 34 adjacent the machining tool 36, where the desired machining operations (drilling, milling, etc.) are performed on the parts clamped onto fixture 28. While the various machine operations are being performed on the fixture 28 within the machining area 34, a technician loads new parts on to the fixture 28 in the load station or replaces the fixture 28 with another fixture 28 already containing parts for machining. Once the machining operations are completed on the parts in the fixture 28 in the machining area 34, the fixture 28 in the machining area is retracted onto the platform 26 of the pallet changing station 14. The pallet changing station 14 is then hydraulically moved up and rotated to swap the positions of the fixtures 28 and continue the production cycle of the parts on the fixtures. In this manner, parts in one fixture 28 can be machined as desired while parts in the other fixture 28 are replaced with unmachined parts to permit the continuous manufacturing of the parts.

Referring to FIG. 2, the hydraulic fluid is supplied to the fixtures 28 in the pallet changing station 14 from a traditional hydraulic fluid supply (not shown) through a rotary coupling assembly 50. The rotary coupling is reciprocally mounted to the housing by a lift cylinder assembly 52, which is fixed to the housing 20. The rotary coupling assembly 50 couples the source of hydraulic fluid to the column 24 of the pallet changing station 14. An articulating arm 54 carries hydraulic lines 56 from the rotary coupling assembly 50 to the fixtures 28.

Figure 3:
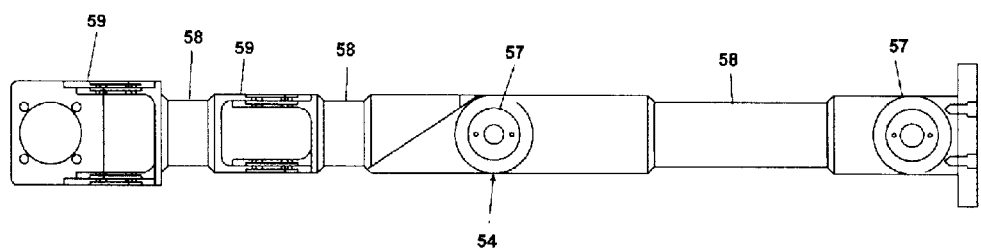
FIG. 3 illustrates an articulated arm for coupling the fixtures to the column of the pallet changing station.

FIGS. 2 and 3 better illustrate the articulating arm 54 which comprises multiple vertically oriented hinges 57 and multiple horizontal hinges 59 coupled together by tubular portions 58. Preferably, the tubular portions are threaded onto an end of the adjacent vertical or horizontal hinges 57, 59 to complete the articulating arm 54. The interior of the articulating arm is essentially hollow and can receive multiple hydraulic lines 56 emanating from the rotary coupling assembly 50, carried within the interior of the articulating arm 54, and terminating in and connected to a rotary coupling 60 mounted to the end of the arm and connected to the fixture 28. The articulating arm 54 is capable of movement toward and away from the column 24 and vertically relative to column 24.

Figure 4:
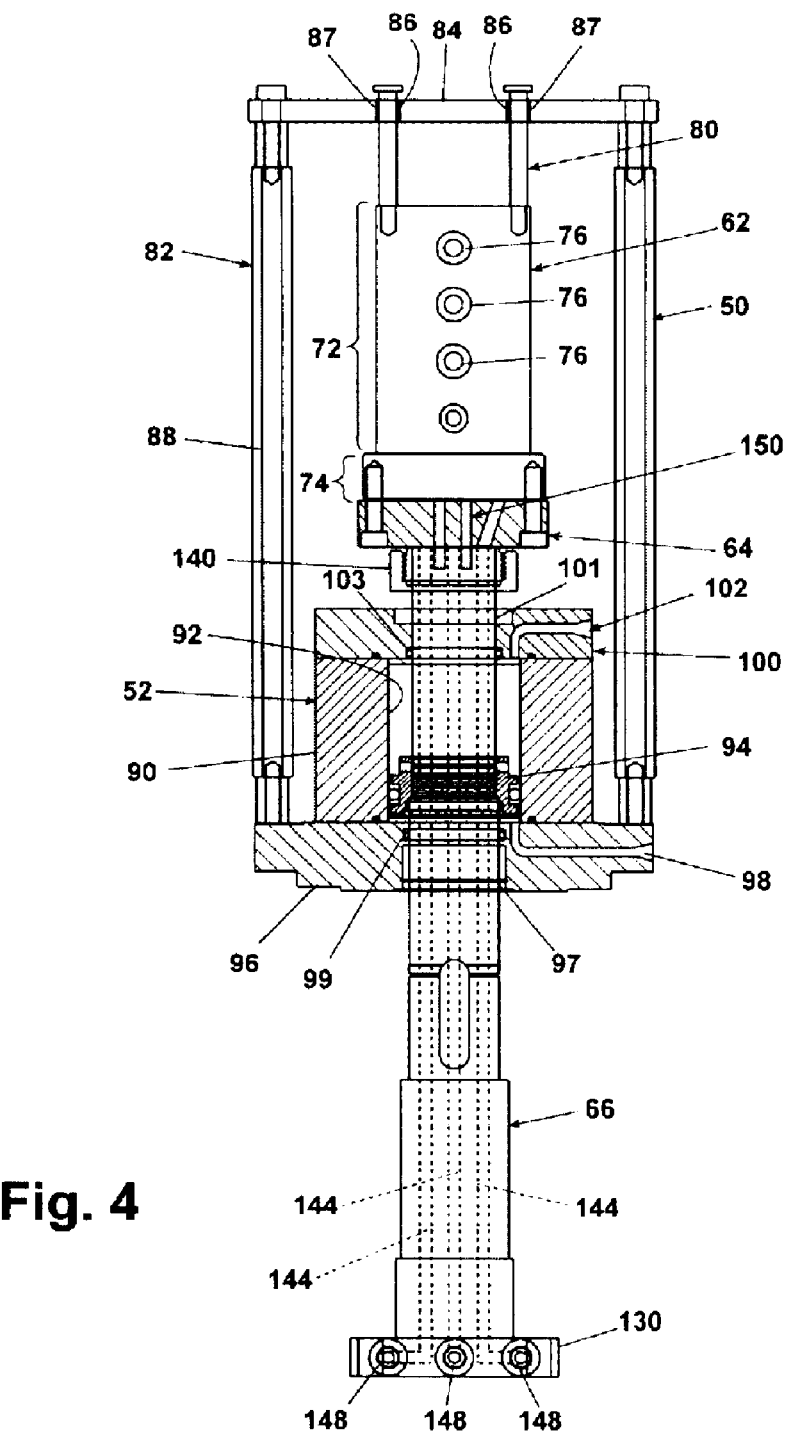
FIG. 4 illustrates a hydraulic lift assembly and a rotary coupling assembly, including a rotary coupling connected to a shaft through an adapter and an anti-rotation assembly for supporting a rotary coupling.

FIGS. 2 and 4 illustrate the lift cylinder assembly 52 which comprises a lift cylinder 90 defining an interior bore 92 in which is slidably received a piston 94, which is threaded onto the exterior of the shaft 66. The shaft and the piston 94 extend through the bore 92. A bottom plate 96 comprises a bore 97 with an O-ring seal 99 for sealing the bottom of the lift cylinder 90 with respect to the shaft 66. A fluid port 98 extends from the exterior of the bottom plate 96, into the bore 92 below the piston 94, permitting the introduction or exhaustion of hydraulic fluid beneath the piston 94 through the port 98. Similarly, a top plate 100 has a bore 101 that contains an O-ring seal 103 for sealing the top of the lift cylinder 90 with respect to the shaft 66. A port 102 extends from the exterior of the top plate 100 to the bore 92 of the lift cylinder above the piston 94 to permit the introduction or exhaustion of hydraulic fluid above the piston 94. By introducing or exhausting hydraulic fluid through the ports 98 and 102, it is possible to raise and lower the shaft 66 and, thus, raise and lower the column 24 with the lift cylinder assembly 52.

Figure 5:
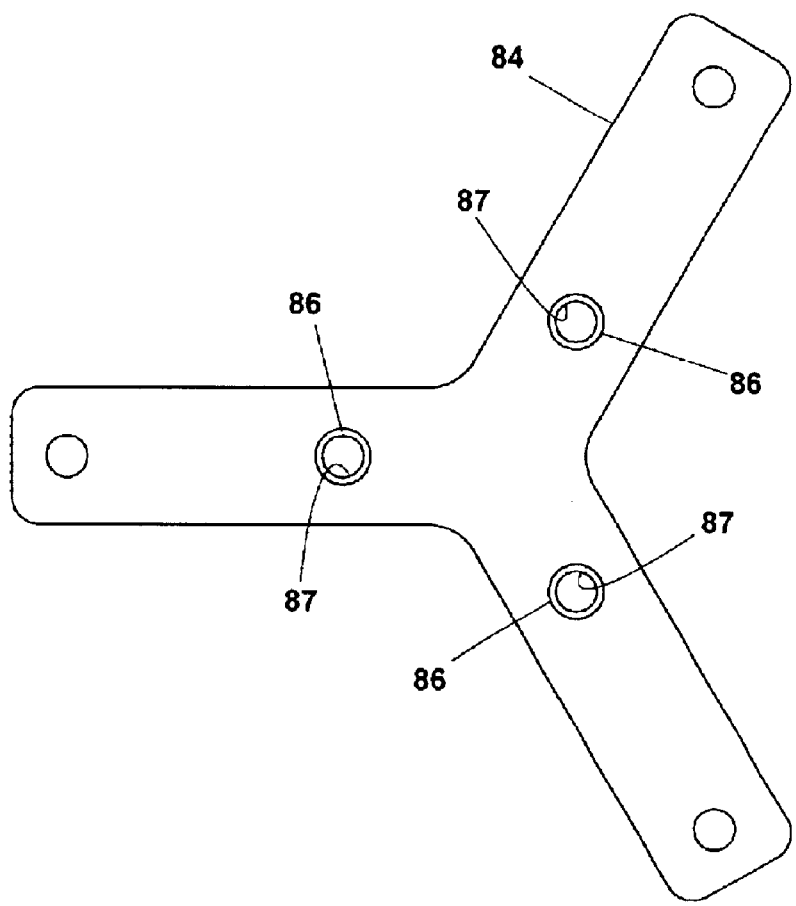
FIG. 5 illustrates a strap for the anti-rotation assembly of FIG. 4.
Figure 6:
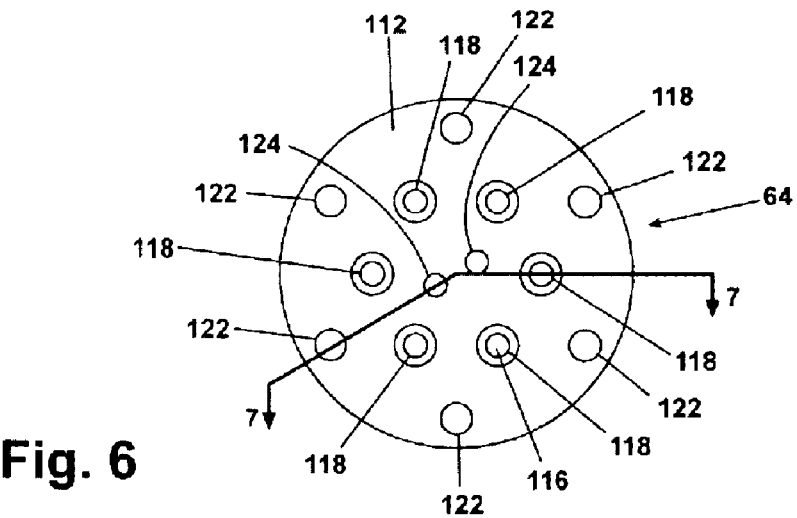
FIG. 6 is a top view of the adapter of FIG. 4.
Figure 7:
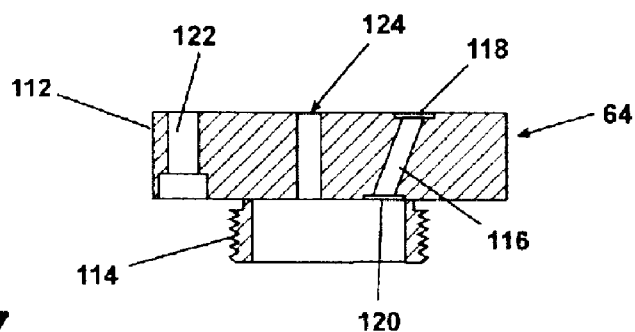
FIG. 7 is a sectional view of the adapter taken along lines 7—7 of FIG. 4.
Figure 8:
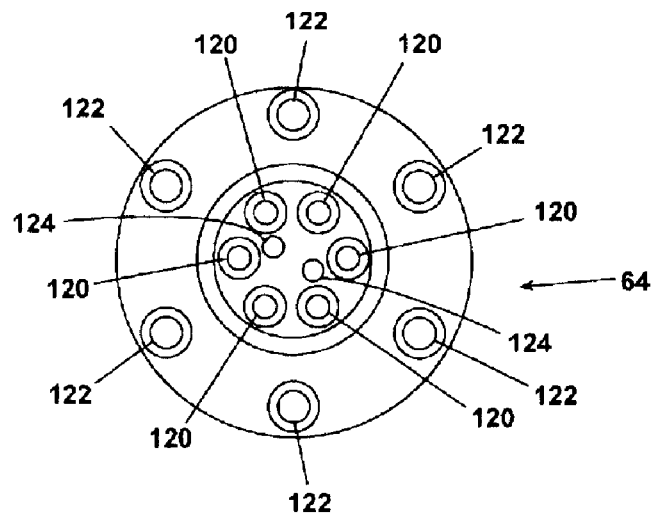
FIG. 8 is a bottom view of the adapter of FIG. 4.

Referring to FIGS. 2, 4 and 5, the rotary coupling 50 comprises a rotary coupling 62 with an adapter 64 connecting the rotary coupling to a shaft 66, which is fixedly connected to the top of the column 24. The shaft effectively functions as an extension of the column 24 and is operably coupled to the lift cylinder assembly 52 whereby the lifting of the shaft 66 by the lift cylinder assembly 52 will correspondingly lift the column 24.

The rotary coupling 62 is of a well-known configuration and comprises an inlet portion 72 and an outlet portion 74, which rotate relative to each other. The inlet portion 72 comprises multiple inlet ports 76, which through the internal structure of the rotary coupling 62, are fluidly connected to discrete outlet ports (not shown) arranged on the bottom of the outlet portion 74, adjacent the adapter 64. A suitable rotary coupling 62 is manufactured by Carr Lane Mfg. in St. Louis, Mo.

Shoulder bolts 80 extend from the top of the inlet portion 72 of the rotary coupling 62 and operably connect the rotary coupling 62 to an anti-rotation device 82. The anti-rotation device 82 comprises a strap 84 having openings 86 in which are pressed bushings 87 to slidably receive the shoulder bolts 80 of the rotary coupling 62. The strap 84 is fixedly supported from the base plate 96 of the lift cylinder assembly 52 by anti-rotation standoffs 88.

Referring to FIGS. 4 and 6–8, the adapter 64 physically and fluidly couples the rotary coupling 62 to the upper end of the shaft 66. The adapter 64 comprises a main body 112 from which extends an externally threaded collar 114. A series of angled ports 116 having their inlet 118 on the upper surface of the main body 112 and their outlet 120 on the lower surface of the main body 112 within the interior of the threaded collar 114. The inlets 118 to the ports 116 are spaced about the upper surface of the main body 112 so that they correspond to the outlet ports of the rotary coupling 62. Essentially, the ports 116 collect the outlet ports of the rotary coupling 62 into a much closer radial spacing and one that which will fit within the outer diameter of the upper end of the shaft 66.

A series of openings 122 are spaced around the periphery of the main body 112 and permit bolts or other fasteners to pass through the main body 112 to secure the adapter 64 to the outlet portion 74 of the rotary coupling 62. Two dowel pin openings 124 are disposed radially interiorly of the ports 116 in the main body 112 and receive dowels for aligning the shaft and the adapter 64.

Figure 10:
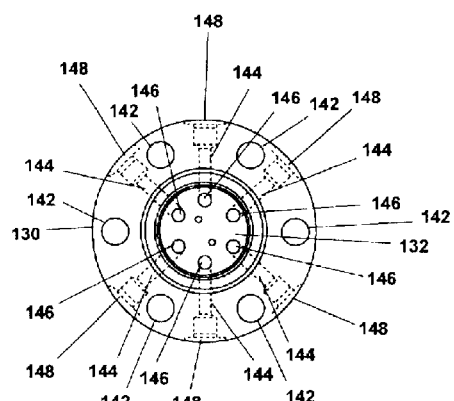
FIG. 10 is a top view of the shaft of FIG. 9.
Figure 9:
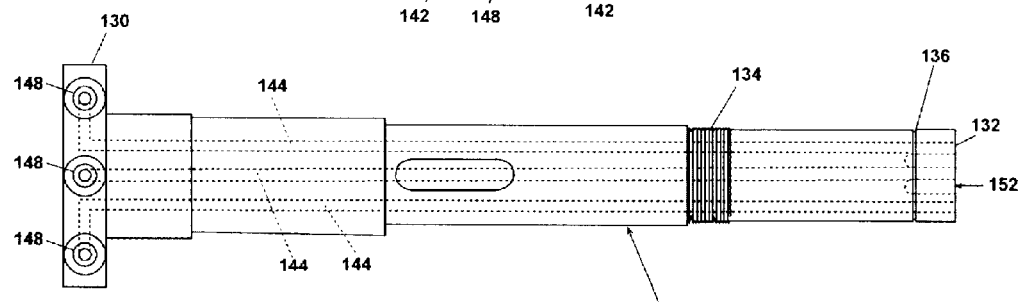
FIG. 9 is a side view of the shaft of FIG. 4.

Referring to FIGS. 4, 9 and 10, the shaft 66 comprises a circular base 130 at one end of the shaft 66 and a generally flat end 132 at the opposing end of the shaft 66. Dowel pin openings 152, corresponding to dowel pin openings 124, are formed in the upper end 132 of the shaft 66 and receive a portion of the dowels (not shown) to align the adapter 64 and the shaft 66.

A portion of the shaft between the base 130 and the end 132 is threaded at 134 and threadably receives the piston 94 of the lift cylinder assembly 52. A groove 136 for receiving a conventional snap ring (not shown) is positioned near the upper end 132 of the shaft 66. A sleeve 140 is slidably received over the end of the shaft 132 prior to the mounting of the snap ring within the groove 136 and threads onto the threaded collar 14 of the adapter 64 to connect the upper end 132 of the shaft 66 to the adapter 64.

Multiple fluid passages 144 extend from inlet ports 146 on the upper end 132 of the shaft axially therethrough to the base 130, where the ports turn radially outward to emanate in outlet ports 148. The base 130 comprises multiple openings 142 disposed about its periphery through which fasteners such as bolts or the like will pass to secure the base of the shaft to the rotatable support column 24 of the pallet changing station 14. Preferably, the fluid passages 144 are gun drilled through the shaft 66.

The passages 144 extending through the shaft 66 along with the rotary coupling 62 and the hydraulic lines 56 form part of a hydraulic conduit that permits the hydraulic fluid to be distributed from the hydraulic fluid source to the fixtures 28. The fluid passages 144 eliminate the need for a set of hydraulic lines extending from the rotary coupling 62 to the lines 56, along with their corresponding individual rotary couplings. The advantage of integrating the fluid passages 144 with the shaft 66 instead of using separate lines is that the passages 144 are always fluidly aligned with the column 24 and are not subject to twisting or wrapping about the column 24. Additionally, since the articulating arm 54 has one end fixed to the column 24, the lines 56, which run from the base of the shaft 66 and through the arm 54, are not subject to any relative movement between the column and the arm 54, effectively eliminating the twisting of the prior art lines that led to the loosening of the individual rotary couplings.

While the invention has been specifically described in connection with certain specific embodiments thereof, it is to be understood that this is by way of illustration and not of limitation, and the scope of the appended claims should be construed as broadly as the prior art will permit.

What is claimed is:

1. A machining center for machining parts carried by a fixture, comprising:
   a housing defining a fixture loading area for receiving the fixture and a machining area for receiving the fixture during the machining of the parts;

a machining tool located in the machining area for performing machining operations on a part carried by the fixture;

a pallet changing station comprising a vertically-orientated rotating column assembly and a platform for supporting the fixture, with the platform mounted to the column and having a first portion located in the loading area and a second portion located in the machining area, wherein the rotation of the column assembly moves the platform first portion from the loading area to the machining area and the platform second portion from the machining area to the loading area, so that the fixture is moved from the loading area to the machining area for performing the machining operations on the part and from the machining area to the loading area for removing the machined parts from the fixture;

a clamping system comprising a hydraulic conduit extending into the pallet changing station for supplying pressurized hydraulic fluid to the fixture from a source of pressurized hydraulic fluid for clamping the parts to the fixture;

wherein the column assembly comprises a portion having an internal bore forming part of the hydraulic conduit for fluid connection of the hydraulic fluid source with the clamping system; and an articulating arm comprising a hollow interior, having a first end mounted to the column assembly and a second end for mounting to the fixture, and the hydraulic conduit extends through the hollow interior of the arm to the fixture.

2. The machining center of claim 1 wherein the internal bore has an inlet located on an exterior portion of the column assembly for fluid connection with the hydraulic fluid source and an outlet on an exterior portion of the column assembly for fluid connection with the clamping system.

3. The machining center of claim 2 wherein the outlet is located interiorly of the housing and within the pallet changing station.

4. The machining center of claim 3 wherein the inlet is located exteriorly of the housing.

5. The machining center of claim 3, and further comprising a rotary coupling for fluidly connecting the inlet of the internal bore with the hydraulic fluid source.

6. The machining center of claim 3 wherein the hydraulic conduit comprises a hydraulic line for fluidly connecting the outlet with the fixture.

7. The machining center of claim 6, and further comprising a second rotary coupling connecting the hydraulic line to the fixture.

8. The machine center of claim 7, wherein the articulating arm has a second end for mounting the second rotary coupling.

9. A machining center for machining parts carried by a fixture, comprising:

a housing defining a fixture loading area for receiving the fixture and a machining area for receiving the fixture during the machining of the parts;

a machining tool located in the machining area for performing machining operations on a part carried by the fixture;

a pallet changing station comprising a vertically-orientated rotating column assembly and a platform for supporting the fixture, with the platform mounted to the column and having a first portion located in the loading area and a second portion located in the machining area, wherein the rotation of the column assembly moves the platform first portion from the loading area to the machining area and the platform second portion from the machining area to the loading area, so that the fixture is moved from the loading area to the machining area for performing the machining operations on the part and from the machining area to the loading area for removing the machined parts from the fixture; and a clamping system comprising a hydraulic conduit extending into the pallet changing station for supplying pressurized hydraulic fluid to the fixture from a source of pressurized hydraulic fluid for clamping the parts to the fixture;

wherein the column assembly comprises a shaft having an internal bore forming part of the hydraulic conduit for fluid connection of the hydraulic fluid source with the clamping system and a column to which the platform is mounted, a lower end of the shaft is mounted to an upper end of the column to form the column assembly.

10. The machining center of claim 9 wherein the internal bore has an inlet located on an exterior portion of the shaft for fluid connection with the hydraulic fluid source and an outlet on an exterior portion of the shaft for fluid connection with the clamping system.

11. The machining center of claim 10 wherein the outlet is located interiorly of the housing and within the pallet changing station.

12. The machining center of claim 11 wherein the inlet is located exteriorly of the housing.

13. The machining center of claim 10 wherein the shaft comprises a base forming the shaft lower end and the base has a peripheral wall on which the outlet is located.

14. The machining center of claim 13 wherein the shaft has an upper end and the inlet is located on the upper end.

15. The machining center of claim 14 wherein the bore comprises a first portion that extends from the inlet axially through the shaft toward the base and a second portion that extends radially from the first portion through the base to the outlet.

16. The machining center of claim 15 wherein there are multiple hydraulic conduits and multiple bores with corresponding inlets located on the shaft upper end and corresponding outlets located on the base peripheral wall.

17. The machining center of claim 15 wherein the bore is formed by gun drilling the shaft.

18. The machining center of claim 9 wherein the hydraulic conduit comprises a hydraulic line for fluidly connecting the outlet with the fixture.

19. The machining center of claim 18, and further comprising a rotary coupling fluidly connecting the hydraulic line to the fixture.

20. The machining center of claim 19, and further comprising an articulating arm with a hollow interior, a first end of the articulating arm is mounted to the column assembly and a second end mounts the rotary coupling, and the hydraulic line extends through the hollow interior of the arm.

21. The machining center of claim 9 and further comprising a lift mechanism mounted to the housing and operably coupled to the shaft to move the shaft between a lowered position to a raised position to thereby raise and lower the column to effect the raising and lowering of the platform.

22. The machining center of claim 21 wherein the lift mechanism comprises a lift cylinder having a hollow interior that slidably receives the shaft and a piston fixedly mounted to the shaft and located within the lift cylinder hollow interior, whereby pressurized fluid is introduced and exhausted from the lift cylinder to reciprocate the piston within the lift cylinder to move the shaft between the lowered and raised positions.

23. A column assembly for a machining center for machining parts carried by a fixture, the machining center comprising:

a housing defining a fixture loading area for receiving the fixture and a machining area for receiving the fixture during the machining of the parts;

a machining tool located in the machining area for performing machining operations on a part carried by the fixture;

a pallet changing station comprising a moveable platform for supporting the fixture, with the platform having a first portion located in the loading area and a second portion located in the machining area whereby movement of the platform moves the platform first portion from the loading area to the machining area and the platform second portion from machining area to the loading area for moving the fixture between the loading area and machining area;

a clamping system comprising a hydraulic conduit extending into the pallet changing station for supplying pressurized hydraulic fluid to the fixture from a source of pressurized hydraulic fluid for clamping the parts to the fixture; and the column assembly comprising a portion having an internal bore forming part of the hydraulic conduit and being mounted for rotational movement relative to the housing and carrying the platform whereby the rotation of the column assembly moves the platform first portion from the loading area to the machining area and the platform second portion from the machining area to the loading area.

24. The machining center of claim 1 and further comprising a rotary coupling mounted to the first end of the arm for mounting the arm to the fixture.

25. The machining center of claim 24 wherein the arm comprises multiple segments and corresponding hinges rotatably connecting adjacent segments to permit their relative rotation.

26. The machining center of claim 25 wherein the hinges are oriented to permit the arm to rotate relative to both a horizontal and a vertical axis.

27. The column assembly of claim 23 wherein the column assembly comprises a shaft with an internal bore forming the portion of the column assembly that forms part of the hydraulic conduit, and a column for carrying the platform, a lower end of the shaft is mounted to an upper end of the column to form the column assembly.

28. The column assembly of claim 27 wherein the internal bore has an inlet located on an exterior portion of the shaft for fluid connection with the hydraulic fluid source and an outlet on an exterior portion of the shaft for fluid connection with the clamping system.

29. The column assembly of claim 27 wherein the shaft comprises a base forming the shaft lower end and the base has a peripheral wall on which an outlet for the bore is located.

30. The column assembly of claim 29 wherein the shaft has an upper end and an inlet for the bore is located on the upper end.

31. The column assembly of claim 30 wherein the bore comprises a first portion that extends from the inlet axially through the shaft toward the base and a second portion that extends radially from the first portion through the base to the outlet.

32. The column assembly of claim 31 wherein there are multiple hydraulic conduits and multiple bores with corresponding inlets located on the shaft upper end and corresponding outlets located on the base peripheral wall.

33. The column assembly of claim 32 wherein the bore is formed by gun drilling the shaft.

* * * * *